Jan. 9, 1951 N. TANNER 2,537,866
REMOVABLE TROLLEY FOR OVERHEAD DUCTS
Filed Nov. 8, 1946 5 Sheets-Sheet 3

INVENTOR
NORMAN TANNER
BY HIS ATTORNEYS
Howson and Howson

Jan. 9, 1951 N. TANNER 2,537,866
REMOVABLE TROLLEY FOR OVERHEAD DUCTS
Filed Nov. 8, 1946 5 Sheets-Sheet 4

INVENTOR
NORMAN TANNER
BY HIS ATTORNEYS
Howson and Howson

Jan. 9, 1951 N. TANNER 2,537,866
REMOVABLE TROLLEY FOR OVERHEAD DUCTS
Filed Nov. 8, 1946 5 Sheets-Sheet 5

INVENTOR
NORMAN TANNER
BY HIS ATTORNEYS
Howson and Howson.

Patented Jan. 9, 1951

2,537,866

UNITED STATES PATENT OFFICE 2,537,866

REMOVABLE TROLLEY FOR OVERHEAD DUCTS

Norman Tanner, New York, N. Y., assignor to Feedrail Corporation, New York, N. Y., a corporation of New York Application November 8, 1946, Serial No. 708,664

29 Claims. (Cl. 191—23)

This invention relates to trolleys for use in overhead ducts containing feeder rails or electric bus-bars such as are now commonly used in industrial plants where the taking off of power for portable electric tools or other purposes is required anywhere along the duct. More particularly, the invention relates to a trolley which can be inserted into and removed from such a power line duct at any point along the duct.

It is an object of my invention to provide an improved form of trolley for insertion into and removal from the slot in the bottom of the usual feed-rail or bus-bar duct at any point along its length.

Another object is to provide an improved trolley of the foregoing type having a portion of such form as to permit its insertion and removal through said slot, and having means for moving said portion from normal operating position within the duct for the aforesaid insertion or removal.

Another object is to provide means for locking the component parts of the trolley after the trolley has been inserted into the duct and is in operating position therein. A related object is to provide ready means for unlocking so that the trolley may be removed readily at any point when it is desired to do so.

Another object is to provide an improved trolley structure of the above type which is simple in construction and practical to manufacture but which may nevertheless be easily and quickly insertable or removable into or from the trolley duct by ordinary workmen and which at the same time will be strong enough to withstand rough usage.

Another object is to provide for incorporation of and a fuse housing into the trolley structure while yet allowing attainment of the foregoing objects.

Other objects and advantages of my invention will become apparent as it is described in the acompanying drawings.

Figure 1:
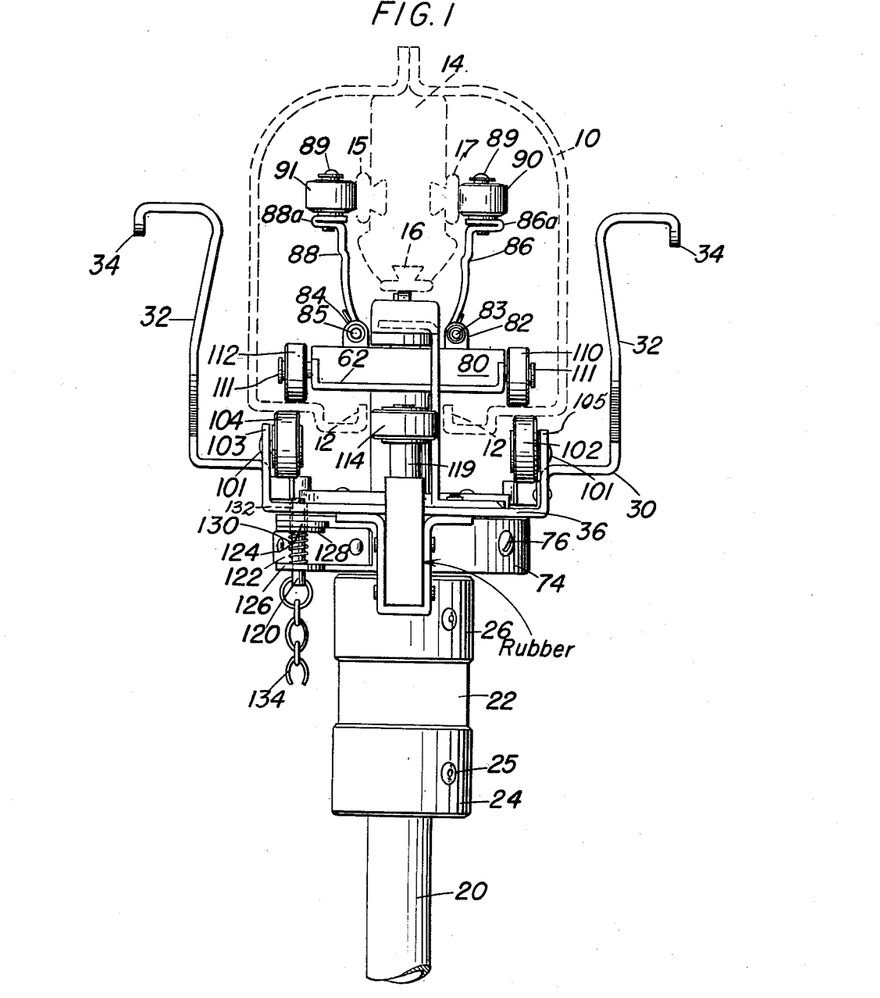
Fig. 1 is an end elevation view of a trolley embodying my invention shown in cooperation with a conventional trolley duct whose parts are illustrated in broken lines.
Figure 2:
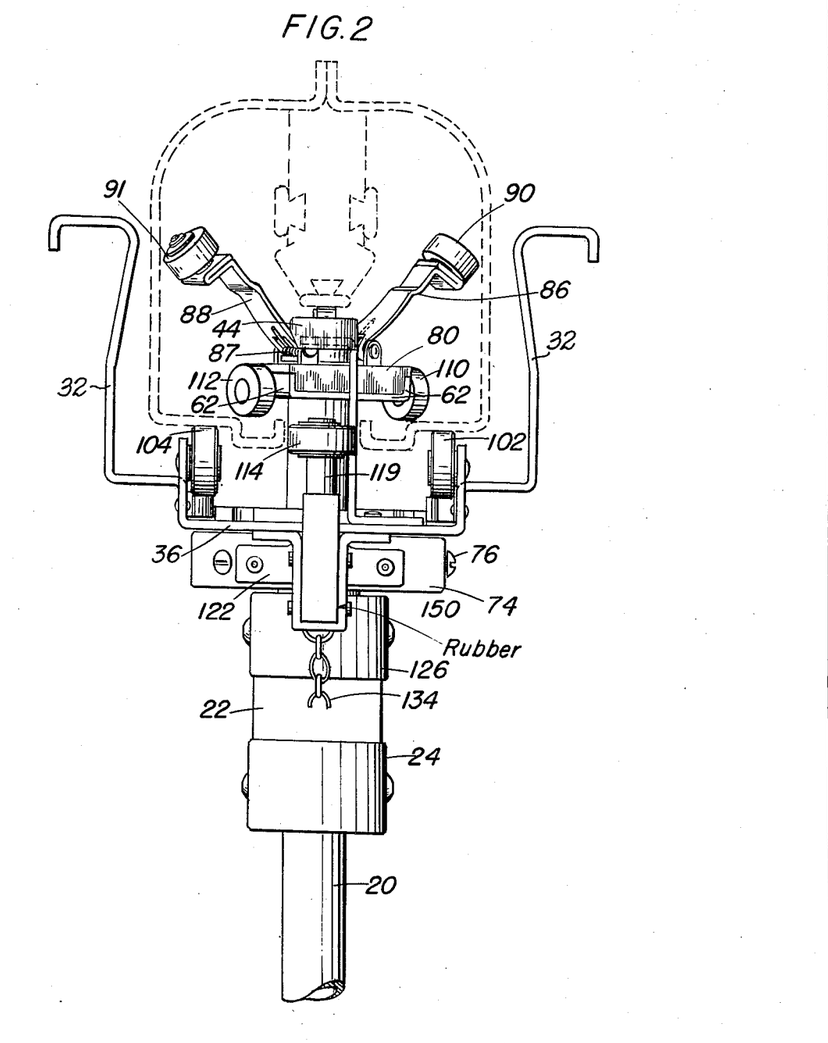
Fig. 2 is a view similar to Fig. 1 but with the parts of the trolley turned 45° in preparation for their removal from the duct.

Referring to the drawings, the trolley duct of the sort disclosed in the Glasgow Patent 2,026,884 dated January 7, 1936, and as illustrated in broken lines in Fig. 1, may comprise a metallic housing 10 appearing generally U-shaped in cross section having the bottom edges of the side walls turned in and bent up, as at 12, providing a longitudinal slot between the inturned edges 12. Within the housing 10 is an insulating bar 14 which supports, in known fashion, the conductors or current feeding rails 15, 16 and 17, the conductors 15 and 17 being on opposite sides of the support 14 and the conductor 16 being on the bottom edge thereof.

My new trolley structure is supported upon a hollow tube or column 20 through a self-straightening universal joint comprising a hollow cylindrical block or tube of rubber 22, upon the top and bottom ends of which are metallic cup-shaped cylindrical caps 24 and 26. The bottom cap 24 is secured to the column 20 by rivets 25 passing diametrically through the cap 24, block 22 and column 20. The upper cap 26 may be riveted in like manner to a member 74, hereinafter more fully described. The trolley has a chassis, designated generally by the numeral 30, which is stamped from sheet metal into the form as best illustrated in Figs. 1, 2, 3 and 5. The side walls 32 of the chassis have their upper edges turned out and reversely bent, as at 34, so as to act as guards to protect the interior mechanism of the trolley when it is removed from the duct and laid down. The bottom of the chassis, between the side walls 32, has its mid portion bent downwardly to form a U-shaped channel. Upon the floor 36 of the channel spaced apart between the middle and opposite ends of the chassis are a pair of upright Z-shaped supporting brackets 40 and 42. Supported upon the top arms of these brackets is an insulating cam bar 44 in the middle of which is a recess receiving a U-shaped stamped sheet metal member 48, one leg of which is longer than the other and affords a bearing for an axle pin on which a roller 50 is mounted. Beneath the transverse portion of the U-member 48 and in the recess in the cam bar 44, is a coil compression spring 52 which tends constantly to urge the roller-carrying member 48 out of the recess. This outward movement is limited by a screw bolt or pin 53 entering transversely in a bore in the side of the cam bar 44 so that the end of the pin or bolt will engage with the top edge of the shorter leg of the member 48 or in a slot in such member and thus maintain the roller mounted within the bar 44. For conducting current from the roller 50 through the column 20, a wire conductor 56 is soldered to a U-shaped stamped sheet metal contactor 55. The roller supporting member 48 slides between and makes contact with the side arms of the contactor 55. The roller 50 is adapted when the trolley is inserted in operative position, as illustrated in Fig. 1, to press resiliently against the middle bus-bar or feeder rail 16.

Mounted between the Z brackets 40 and 42 and located in the center of the chassis 30 is a short post member 60 which is hollow and is welded at its top to a stamped sheet metal bar 62 which has an aperture in register with the passageway through the post 60. The bottom of the post 60 is welded to a circular disc member 64 lying upon the floor 36 of the chassis. If preferred the post 60, bar 62 and disc 64 may be formed as one member. Beneath the floor 36 and axially aligned with the disc 64 is an inverted cup-shaped member 66 which lies against the bottom surface of the floor 36. In order to secure the cup member 66 and the disc member 64 together, in slidable relation to the floor 36, rivets 68 and 69 located in a diametrically opposite position relative to post 60 pass through the disc 64 and cup member 66 and through arcuate slots 70 and 72 formed in the floor 36 about the axis of the post 60. The slots 70 and 72 are of such extent that upon rotating the post and disc 64 through an arc of 90°, the rivets 68 and 69 will move from one end to the other of the slots.

In order to turn the post 60 and the disc 64 and cup member 66 which are connected therewith, another cup member 74 is or may be telescoped with the cup member 66 and is secured thereto by three screws 76 located at spaced point around the periphery of the telescoping cup members. The bottom cup member 74 has formed integrally therewith and depending therefrom a hollow tubular extension 75 opening into a central aperture in that member. Rivets 25 pass through the cap 26, hollow rubber block 22 and extension 75.

From the foregoing it may be readily observed that rotation of the column 20 will cause simultaneous rotation of the post 60 and the bar 62 mounted thereon. The ends of the bar 62 are upturned and have lying between them a bar 80 of insulating material which is secured thereto by screws.

In spaced positions at opposite sides of the central axis of the bar 80 are small U-shaped stamped sheet metal supporting brackets 82 and 84. Pivotally supported on the brackets 82 and 84 are metallic arms 86 and 88. Between the arms of each of the U brackets 82 and 84 are horizontal pivot pins 83 and 85; and the lower end of each of the arms 86 and 88 (the lower ends in Figs. 1 and 2) have a rectangular piece stamped out therefrom to provide parallel extensions which are bent around the pins 83 and 85. Thus the arms 86 and 88 are pivotally mounted upon the pins 83 and 85 in such a way as to leave room for a coiled biasing spring 87 (see Figs. 2 and 6) which has one end extending to press upon the bottom or transverse portion of the supporting brackets 82 and 84 while the other end extends along the outer surface of the arms 88 and 86 so as to urge those arms upwardly into the position shown in Fig. 1.

Each of the arms 86 and 88 has its other end folded back upon itself and the folded portions 86a and 88a are then bent away from the arm at approximately right angles. In each of the folded portions 86a and 88a there is fixedly mounted a radially extending axle pin 89 upon which are mounted rollers 90 and 91. When the arms are in the position illustrated in Fig. 1, the rollers 90 and 91 engage with and roll over the surface of the bus-bars or feeder rails 17 and 15 respectively and conduct the current from the rails through the rollers and arms to the mounting brackets 82 and 84. Electrically connected to the mounting brackets 82 and 84 are wire conductors, such as 92, which pass through the short post member 60 and the universal connection 22 and column 20, issuing from the bottom thereof to an appropriate connector for a portable tool or the like.

Figures 3, 4, 6, 7:
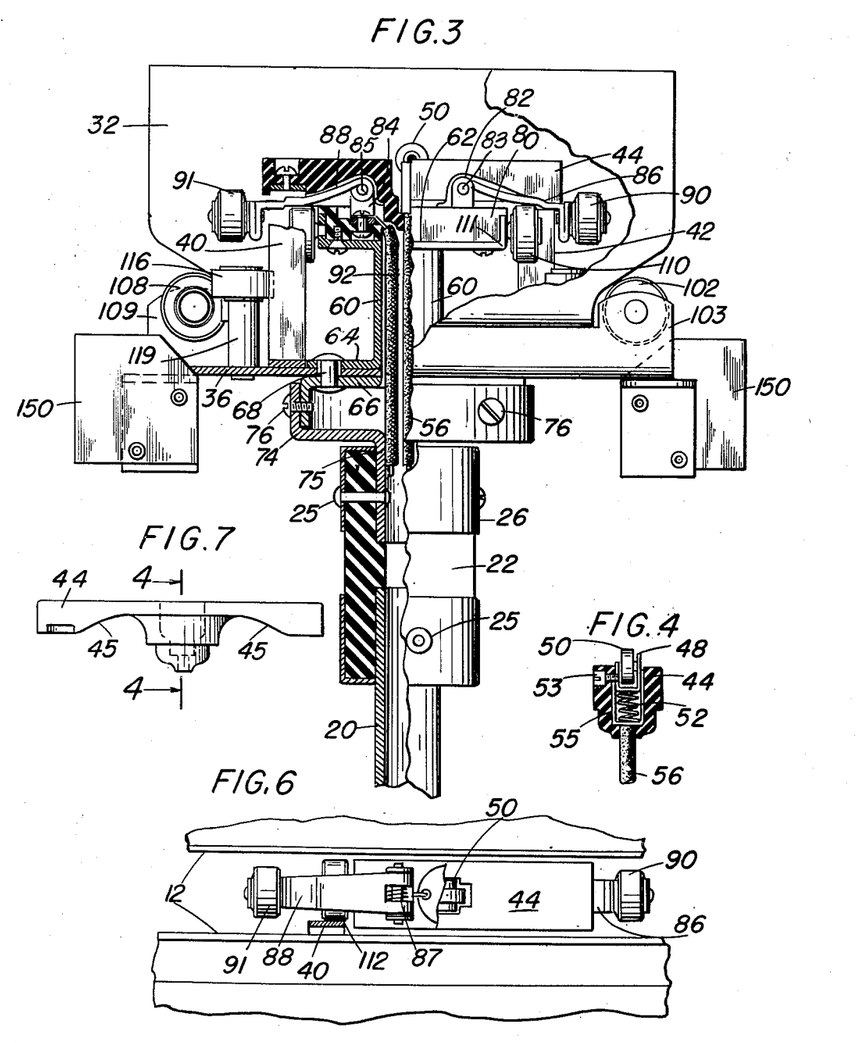
Fig. 3 is a side elevation view, partly in section, of the structure illustrated in Figs. 1 and 2, but with the trolley in position for removal from the duct.
Fig. 4 is a sectional detailed view of the middle bus-bar engaging roller and its mounting in the cam bar.
Fig. 6 is a fragmentary plan view partly broken away, of the structure as illustrated in Fig. 3 with the top of the trolley duct and the current conducting rails omitted.
Fig. 7 is a detailed view showing in side elevation the insulating cam bar.
Figure 5:
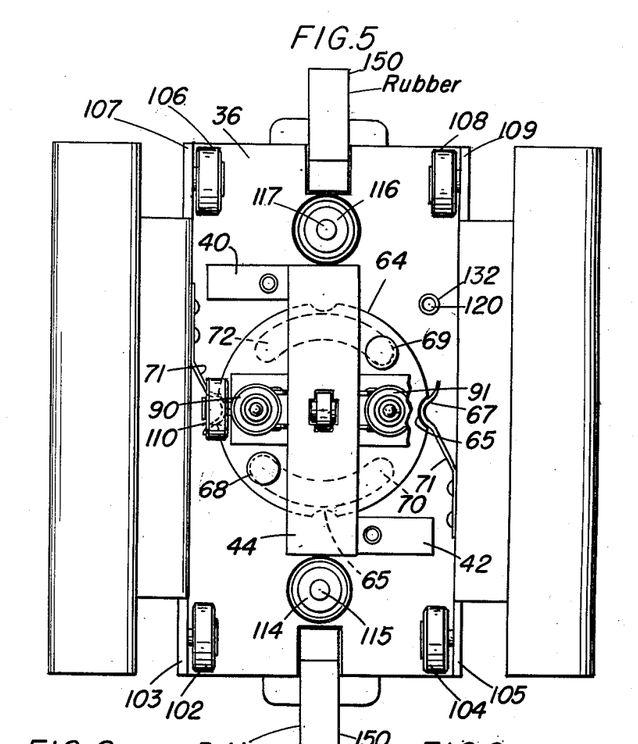
Fig. 5 is a plan view of the structure illustrated in Fig. 1.

From the foregoing it may now be understood that the column 20 by reason of its connections, above described, to the short post 60 and parts carried thereby can be rotated through an arc of 90° as limited by the slots 70 and 72 in the floor of the chassis. Normally when the chassis is not within the duct or has just entered the slot therein, the parts will have the position illustrated in Fig. 3. From this position they may be turned (by rotating the column 20) through the position of Fig. 2 to the position of Fig. 1. In the position of Fig. 3, the arms 86 and 88 and their rollers are held in substantially horizontal position by the cam bar 44. This cam bar is open at its sides and has curved cam surfaces 45 on opposite sides of the central axis, which sufaces allow the arms 86 and 88 to move upwardly by the effort of springs 87 to the position in Fig. 1 during the aforesaid rotation. When the parts have the position in Fig. 1, these springs hold the rollers 90 and 91 resiliently in contact with their respective conductor rails. When it is desired to disconnect the trolley from the duct the column 20 is reversely rotated. During such reverse rotation the cam bar causes the arms 86 and 88 to move through the position of Fig. 2 into the horizontal position of Fig. 3.

In order to hold the trolley in engagement with the duct and to guide its movement while connected therewith, there are provided four rollers 102, 104, 106 and 108 which engage the bottom surface of the duct 10 and two rollers 110 and 112 which engage the inside bottom surface of the duct as may best be seen in Fig. 1. The rollers 110 and 112 are each mounted upon pins 111 which extend horizontally from, and are mounted fixedly in, the vertically bent ends of the supporting bar 62 so that these rollers move with the post 60 and the bar 62 supported thereby as current conducting rollers 90 and 91 move up from the position of Fig. 3 to the position of Fig. 1. In so moving the supporting rollers 110 and 112 pass through the position of Fig. 2 and move over the inside surface of the duct on opposite sides thereof into the position of Fig. 1. The trolley is thus supported by these rollers 110 and 112 during its movement along the trolley duct when the device is in use.

The rollers 102, 104, 106 and 108 are located at the four corners of the bottom portion of the chassis. They are rotatably mounted upon horizontal axle pins 101 which in turn are fixedly mounted in and supported by vertical legs 103, 105, 107 and 109 struck out from the body of the chassis at the four corners of the bottom thereof. Thus these rollers 102, 104, 106 and 108 by their engagement with the underside of the bottom of the duct prevent further upward vertical or longitudinal tilting movement past the position of Fig. 1, while at the same time guiding and facilitating the movement of the trolley along the duct.

Also guiding and tending to limit the sideways or lateral tilting movement of the trolley are rollers 114 and 116 located in the center line of the chassis. They are mounted upon vertical bearing pins 115 and 117, staked into the floor 36 of the chassis. Each pin has an enlarged lower portion, such as 119, to provide a shoulder upon which the side of the roller may rest thereby to locate the roller in proper vertical position. As may be seen by referring to Figs. 1 and 2, the rollers 114 (and in like fashion the roller 116) engage the oppositely facing upturned edges 12 of the duct in either side of the slot through which the trolley is inserted. Thus, these rollers 114 and 116 guide and limit a tendency to sideways or swaying movement of the trolley and maintain it in proper alignment during its movement along the duct.

In order to lock the trolley in the engaged or operative position illustrated in Fig. 1, a vertical spring pressed latch pin 120 is provided. It is mounted in a stamped sheet metal bracket 122 having an arcuate vertical portion from which are bent outwardly in horizontal direction parallel side plates or ears 124, 126 which have aligned apertures to permit the passage of the lock pin 120 therethrough. A collar 128 is secured upon or fixed to the lock pin 120. A spring 130 coiled around the lock pin 120 within the supporting bracket 122 has its upper end pressing against a collar 128 affixed on the lock pin. The lower end of the spring presses upon the lower ear 126. The bracket is or may be riveted, or otherwise secured, to the cup member 74 which it will be recalled rotates with the column 20 during such times as the trolley is being inserted into or removed from its position in the duct. As the trolley comes into the position in Fig. 1, the lock pin 120 snaps into a circular aperture 132. In order to retract the pin, when it is desired to rotate the column 20 reversely for the purpose of removing the trolley, a chain or the like 134 may be attached to the bottom end of the lock pin 120.

In case a positive locking, which can only be released by a conscious unlocking motion such as by the pulling upon the chain 130, is not desired, I have provided at points 90° apart in the periphery of the disc 64 indentations 65, into which may snap arcuately bent end portions 67 of leaf spring members 71 riveted to the side walls of the chassis in position to move in horizontal plane, i. e. parallel to the floor 36. The action of these leaf springs 71 engaging in the indentations 65 tends to locate and hold the parts of the trolley in their operative position (Fig. 1) or in position for insertion or removal of the trolley from the duct, i. e. position of Fig. 3. Obviously the indexing means just described may be used in connection with the locking means if desired.

Figure 8:
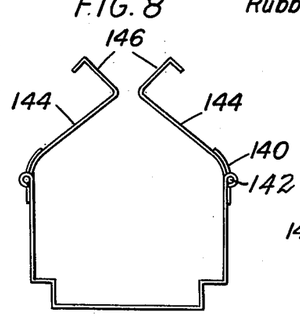
Fig. 8 is an end elevation view illustrating a modified form of housing for the trolley.
Figure 9:
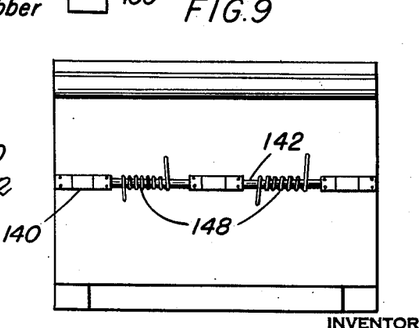
Fig. 9 is a side elevation view of the housing illustrated in Fig. 8.

In some instances it may be desirable to provide a more complete covering and protection for the trolley mechanism when it is not within the duct. In Figs. 8 and 9 I have shown a form of chassis which in its bottom portion is similar to the chassis illustrated in Figs. 1, 2, 3 and 5. The upper edges of the side walls, however, each have hinges 140 attached thereto through which pass a pintle 142. To the hinges are attached the bottom edges of similar cover plates 144 whose top edges are bent outwardly at right angles to present divergent surfaces 146 which upon coming in contact with the bottom of the duct will cause the covers 144 to hinge outwardly, i. e. to open. In order to urge the covers 144 normally toward each other, i. e. to close, spring 148 may be wound around the pintle 142 with the extending ends of the springs pressing against the outside surfaces of the side walls of the chassis and the cover plates 144 respectively.

Thus when the trolley is pressed against the duct in the first act of inserting the trolley into the duct, the cover plates 144 will be pushed back and thereafter the insertion of the trolley may proceed as in the form of invention illustrated in Figs. 1–7. When the trolley is withdrawn the cover plates will resume their closed position overlying and protecting the trolley mechanism after the trolley has been withdrawn from the duct.

Figure 10:
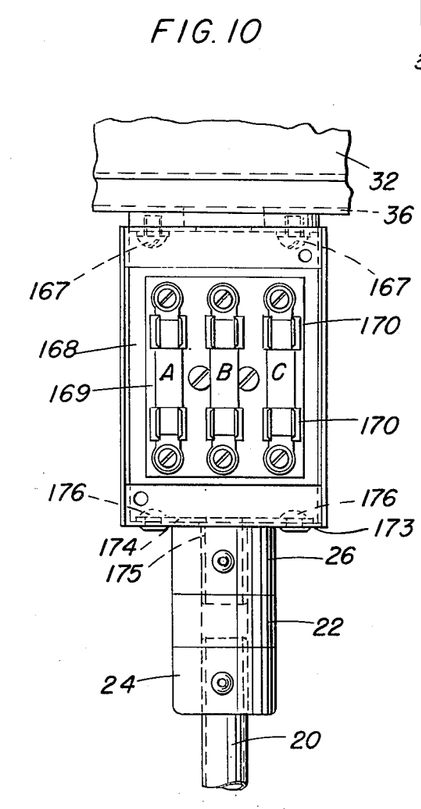
Fig. 10 is a side elevation view partly broken away, of a modified form of the invention having provision for a fuse protection of the trolley.
Figure 11:
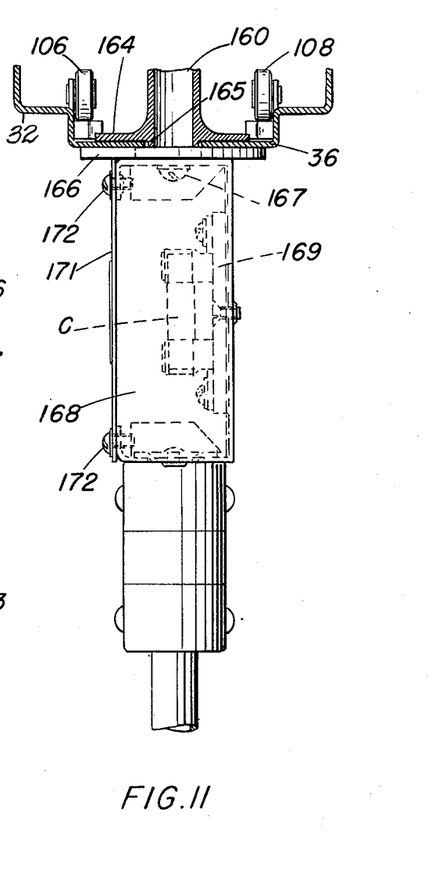
Fig. 11 is an end elevation view, partly in section, of the structure illustrated in Fig. 10.

In certain cases it may be desirable to include means to protect the trolley by fuses. In Figs. 10 and 11 I have incorporated fuse protection into the trolley structure in a novel and compact manner. Referring to these figures, the chassis 32 has a post 160, similar to the post 60 in the previously described figures. On the bottom of the post and formed integrally therewith is a flange 164 which lies upon the floor 36 of the chassis. Also formed integrally with the post 60 is an extension thereof 165 through an aperture in the floor 36 so as to provide a guide for the rotary movement of the post. If desired, the post, flange and tubular extension 165 may be formed as a casting. Beneath the floor is a washer 166 performing a function similar to the part 66 in the previously described figures. The washer 166 and flange 164 are secured together by rivets (not shown) like the rivets 68 which ride in arcuate slots as hereinbefore described.

Secured to the washer 166 by bolts 167 is a rectangular stamped sheet metal fuse box having fastened in the back thereof an insulating plate 169 upon which are mounted six fuse clips such as 170 of conventional design. The fuse clips receive conventional cartridge fuses A, B and C. Across the open front of the box is a cover plate 171 which may be secured in place by bolts 172 in the corners of the box.

In the bottom or lower end wall 173 of the box 168 there is a circular opening through which may pass common conductor wires (not shown) connected to the clips of the fuses A, B and C. Also passing through the aperture is a tubular member 175 having a flange 174 extending from its upper or inner end to lie against the inner surface of the bottom wall 173. This flange is secured in such position by rivets 176. The tubular portion 175 extends within a tubular rubber member 22 like that previously described in order to form a universal joint with the column 20. In other respects the structure of the universal joint is similar to that in the form of the invention previously described.

From the foregoing it may readily be observed that the turning of the column in Figs. 10 and 11 will cause simultaneous rotation of the fuse box 168 and the washer 166. Since the washer 166 is connected with the post 160, that post will also turn. In other respects functioning and operation of the invention as illustrated in Figs. 10 and 11 is the same as in Figs. 1–7 inclusive.

The usual rubber bumpers 150 may be mounted upon the chassis at opposite ends to protect the trolley, if desired.

A universal joint constructed as described is desirable in many uses of the invention, particularly because of its ability and its tendency to straighten itself out. However, this joint may not be required in some uses. When not required, the self-straightening universal joint may be omitted and the handle (not shown) connected directed to the fuse box (Figs. 10–11) or to member 74 (Fig. 3).

Many modifications of my invention will occur to those skilled in the art. Therefore I do not limit it to the specific embodiments of the invention as herein described and illustrated.

I claim:

1. A trolley, for insertion at any point into the longitudinal slot in the bottom of a duct containing bus-bars located in the center of the duct, said trolley comprising a chassis, means on said chassis insertable into said slot, manually operated means outside the duct to rotate said insertable means relative to said chassis when the insertable means is within the duct, bus-bar contacting rollers and trolley supporting rollers mounted on said insertable means, means operable by rotation of said manually-operated means to cause said bus-bar contacting rollers to swing laterally and upwardly into engagement with the bus-bars, and means to maintain said insertable means with said contacting rollers engaging the bus-bars and said supporting rollers in position to roll along said duct.

2. A trolley, for insertion at any point into the longitudinal slot in the bottom of a duct containing bus-bars located in the center of the duct, said trolley comprising a chassis, means depending from said chassis for manual actuation, means extending up from said chassis into said duct, means connecting said depending means with said extending means to cause movement of the latter by the former, bus-bar engaging rollers carried by said extending means operated by said manual actuating means, and means to cause said rollers to move laterally and downwardly while still within the duct from bus-bar engaging position to a position wherein they may be withdrawn through said slot as the chassis is moved downwardly, and means supporting said trolley upon said duct while said rollers are in engagement with the bus-bars.

3. A trolley, for insertion at any point into the longitudinal slot in the bottom of a duct containing bus-bars located in the center of the duct, said trolley comprising a chassis, means depending from said chassis for manual actuation, bus-bar engaging roller means supported from said chassis and movable laterally and downwardly while still within the duct from a position engaging the bus-bars to a position wherein the rollers may be withdrawn through said slot as said chassis is lowered, means connecting said roller means and said depending means to enable said roller means to be moved laterally and downwardly by said depending means, and means supporting said trolley upon said duct while said roller means are engaged with the bus-bars.

4. A trolley, for insertion at any point into the longitudinal slot in the bottom of a duct containing bus-bars located in the center of the duct, said trolley comprising a chassis, means depending from said chassis for manual actuation, bus-bar engaging roller means supported from said chassis and movable laterally and downwardly while still within the duct from a position engaging the bus-bars to a position in alignment with said slot, said roller means in said aligned position having its widest dimension less than the width of said slot to permit said roller means to be withdrawn through said slot as said chassis is lowered, means connecting said depending means with said roller means to enable the latter to be moved laterally and downwardly by said depending means, and means supporting said trolley upon said duct while said roller means are engaged with the bus-bars.

5. A trolley, for insertion at any point into the longitudinal slot in the bottom of a duct containing bus-bars located in the center of the duct, said trolley comprising a chassis, means depending from said chassis for manual actuation, bus-bar engaging roller means supported from said chassis and movable laterally and downwardly while still within the duct from a position engaging the bus-bars to a position wherein the rollers may be withdrawn through said slot as said chassis is lowered, means connecting said roller means and said depending means to enable said roller means to be moved laterally and downwardly by said depending means, and supporting roller means movable along the inside of said duct, said supporting roller means being mounted for concomitant movement with said bus-bar roller means by said depending means from operative position within the duct to a position permitting withdrawal of both said roller means through said slot.

6. A trolley, for insertion at any point into the longitudinal slot in the bottom of a duct, containing bus-bars located in the center of the duct, said trolley comprising a chassis, means depending from said chassis for manual actuation, bus-bar engaging roller means supported from said chassis and movable laterally and downwardly while still within the duct from a position engaging the bus-bars to a position in alignment with said slot, said roller means in said aligned position having its widest dimension less than the width of said slot to permit said roller means to be withdrawn through said slot as said chassis is lowered, means connecting said depending means with said roller means to enable the latter to be moved laterally and downwardly by said depending means, and supporting roller means movable along the inside of said duct, said supporting roller means being mounted for concomitant movement with said bus-bar roller means by said depending means from operative position within the duct to a position permitting withdrawal of both said roller means through said slot.

7. A trolley for insertion at any point into the unitary longitudinal slot in the bottom of a bus-bar containing duct, said trolley comprising a chassis, means depending from said chassis for manual actuation, supporting means upon said chassis insertable into the said slot, cam means mounted on and entering the duct with said supporting means, sustaining means movable relatively to said cam means and relative to said inserted supporting means, bus-bar contacting means supported from said sustaining means and cooperating with said cam means to be moved from bus-bar engaging position into a position permitting withdrawal through said slot at any point, said change of position taking place on actuation of said depending means.

8. A trolley as claimed in claim 7 having roller means for suporting the trolley within the duct carried by said sustaining means.

9. A trolley as claimed in claim 7 having a bus-bar engaging element mounted on said supporting means.

10. A trolley as claimed in claim 7 wherein said cam means are shaped to cause the bus-bar contacting means to move into substantially vertical position to engage the busbars and into substantially horizontal position to permit withdrawal through said slot.

11. A trolley as claimed in claim 7 wherein said bus-bar contacting means includes a pivotally mounted arm carrying a bus-bar contacting element and spring means urging said arm into substantially vertical position wherein the roller engages with a bus-bar.

12. A trolley, for insertion at any point into the longitudinal slot in the bottom of a bus-bar containing duct, said trolley comprising a chassis, means depending from said chassis for manual actuation, supporting means upon said chassis insertable into said slot, cam means on said supporting means, other supporting means movable relatively to said cam means, bus-bar contacting means supported from said other supporting means and cooperating with said cam means to be moved from bus-bar engaging position into a position permitting withdrawal through said slot at any point, trolley-supporting roller means movable along the inside of said duct and carried by and moving with said other supporting means, the change of position of said bus-bar contacting means and said trolley-supporting roller means taking place on rotation of said depending means, said bus-bar contacting means including a pivotally mounted arm carrying a bus-bar contacting element, and spring means urging said arm from a substantially-horizontal into substantially vertical position wherein said element engages with a bus-bar.

13. A trolley, for insertion at any point into the longitudinal slot in the bottom of a bus-bar containing duct, said trolley comprising a chassis, means depending from said chassis for manual actuation, supporting means upon said chassis insertable into said slot, cam means on said supporting means, other supporting means movable relatively to said cam means, bus-bar contacting means supported from said other supporting means and cooperating with said cam means, said cam means being formed to move said bus-bar contacting means from a substantially vertical bus-bar engaging position into a substantially horizontal position in substantial alignment with said slot permitting withdrawal therethrough at any point, trolley-supporting roller means movable along the inside of said duct and carried by and moving with said other supporting means into position in substantial alignment with said slot, said alignment taking place by actuation of said depending means.

14. A trolley as claimed in claim 13 wherein said bus-bar contacting means includes a pivotally mounted arm carrying bus-bar contacting element, and spring means urging said arm into from substantially horizontal to substantially vertical position wherein said element engages with a bus-bar.

15. A trolley, for insertion at any point into the longitudinal slot in the bottom of a bus-bar containing duct, said trolley comprising a chassis, means depending from said chassis for manual actuation, said depending means being hollow, a hollow post member supported on said chassis, means connecting said post member and said depending means to cause joint rotative movement thereof relative to said chassis, cam means mounted on said chassis, bus-bar contacting means pivotally supported from and insulated from said post member, said contacting means engaging with said cam means on rotation of said depending means to move said contacting means from bus-bar engaging position into position to permit withdrawal through said slot at any point, means urging said contacting means into bus-bar engaging position, and electric conductors connected with said contacting means and running through said post and said depending means.

16. A trolley as claimed in claim 15 having means to lock said post in with said contacting means engaging said bus-bars.

17. A trolley as claimed in claim 15 having a resiliently mounted bus-bar contacting element on said cam means engageable with the central bus-bar.

18. A trolley as claimed in claim 15 having supporting rollers carried by said post member and rotating with said post member as said contacting means move from bus-bar engaging position, to permit withdrawal from said slot at any point.

19. A trolley as claimed in claim 15 having a flexible member in said depending means providing a universal joint between said depending means and said chassis.

20. A trolley as claimed in claim 7 having a unitary flexible member in said depending means providing a universal joint between said depending means and said chassis.

21. A trolley as claimed in claim 15 having enclosed fusible means incorporated between the manual actuating means and the chassis to protect the trolley mechanism.

22. A trolley as claimed in claim 1 having enclosed fusible means incorporated between the manual actuating means and the chassis to protect the trolley mechanism.

23. A trolley as claimed in claim 15 having enclosed fusible means rotatable with said manual actuating means and protecting said trolley mechanism.

24. A trolley as claimed in claim 1 having enclosed fusible means rotatable with said manual actuating means and protecting said trolley mechanism.

25. A trolley as claimed in claim 7 having a unitary resilient member between said depending means and said chassis enabling universal movement of said depending means, said resilient member tending to return itself and said depending means to its original position, upon being released after movement into another position.

26. A trolley mechanism as claimed in claim 7, having a metal guide and protective means provided with side portions engageable with the outside walls of the bus-bar containing duct to guide the insertion of the trolley into the duct and to shield and protect the mechanism of the trolley from breakage when the trolley is out of the duct.

27. A trolley mechanism as claimed in claim 15 having a metal guide and protective means provided with said portions engageable with the outside walls of the bus-bar containing duct to guide the insertion of the trolley into the duct and to shield and protect the mechanism of the trolley from breakage when the trolley is out of the duct.

28. A trolley mechanism as claimed in claim 1 having a metal guide and protective means provided with side portions engageable with the outside walls of the bus-bar containing duct to guide the insertion of the trolley into the duct and to shield and protect the mechanism of the trolley from breakage when the trolley is out of the duct.

29. A trolley mechanism insertable into a bus-bar containing duct, comprising a chassis, bus-bar engaging elements mounted on said chassis, means depending from said chassis through which conductor wires pass to said chassis, and metal guide means engageable with the outside walls of the bus-bar containing duct to guide the insertion of the trolley into the duct, said guide having side walls coextensive with the chassis and extending beyond the trolley mechanism when away from the duct to shield and protect the mechanism of the trolley from breakage when the trolley is out of the duct.

NORMAN TANNER.

REFERENCES CITED

The following references are of record in the file of this patent:

UNITED STATES PATENTS

| Number | Name | Date |
|---|---|---|
| 1,917,009 | Betts et al. | July 4, 1933 |
| 2,018,016 | Frank et al. | Oct. 22, 1935 |
| 2,117,552 | Frank et al. | May 17, 1938 |
| 2,132,022 | Frank et al. | Oct. 4, 1938 |
| 2,210,171 | Horn | Aug. 6, 1940 |